United States Patent [19]

Woodhead et al.

[11] 4,356,106

[45] Oct. 26, 1982

[54] CERIUM COMPOUNDS

[75] Inventors: James L. Woodhead, Didcot; Graham Raw, Abingdon, both of England

[73] Assignee: United Kingdom Atomic Energy Authority, London, England

[21] Appl. No.: 255,818

[22] Filed: Apr. 20, 1981

[30] Foreign Application Priority Data

May 9, 1980 [GB] United Kingdom ............... 8015395

[51] Int. Cl.$^3$ .............................................. B01J 13/00
[52] U.S. Cl. ............................... 252/313 R; 252/317; 423/263
[58] Field of Search ........................ 252/317, 313 R; 423/263

[56] References Cited

U.S. PATENT DOCUMENTS

| | | | |
|---|---|---|---|
| 3,761,571 | 9/1973 | Woodhead | 423/263 |
| 4,231,893 | 11/1980 | Woodhead | 252/313 R |

FOREIGN PATENT DOCUMENTS

| | | | |
|---|---|---|---|
| 1342893 | 1/1974 | United Kingdom | 252/313 R |

*Primary Examiner*—Lucille M. Phynes
*Attorney, Agent, or Firm*—Larson and Taylor

[57] ABSTRACT

The present invention relates to compounds and more particularly to cerium compounds.

According to one aspect of the present invention there is provided a process for the preparation of a dispersible cerium compound which comprises heating a substantially dry cerium (IV) oxide hydrate in the presence of a deaggregating agent to cause deaggregation of aggregated crystallites in the cerium (IV) oxide hydrate and produce a dry dispersible cerium compound.

14 Claims, No Drawings

CERIUM COMPOUNDS

The present invention relates to compounds and more particularly to cerium compounds.

According to one aspect of the present invention there is provided a process for the preparation of a dispersible cerium compound which comprises heating a substantially dry cerium (IV) oxide hydrate in the presence of a deaggregating agent to cause deaggregation of aggregated crystallites in the cerium (IV) oxide hydrate and produce a dry dispersible cerium compound.

Preferably the deaggregating agent comprises acid species.

It is to be understood that the concentration of deaggregating agent used and the temperature and time of heating is such that the desired degree of deaggregation is effected. The concentration, temperature and time can be determined by experimentation for a particular cerium (IV) oxide hydrate starting material.

By "dispersible cerium compound" as used in this Specification it is meant that the cerium compound is dispersible in aqueous media (e.g. water or aqueous acid solutions) to give a colloidal dispersion (i.e. a sol). The dry dispersible cerium compound may of course still contain "structural" water.

The term "acid species" as used in this Specification embraces hydrogen ions, hydroxonium ions and anions which normally accompany hydrogen or hydroxonium ions in acidic conditions (e.g. nitrate ions). Preferably the anion concentration (e.g. $NO_3^-$) in the dry dispersible cerium compound is controlled so as to facilitate the dispersion of the cerium compound in aqueous media. This control may be effected by controlling the removal of anions by heating.

British patent application No. 22835/78 (UKAEA) (to which West German Offenlegungsschrift No. 2857146 corresponds) discloses inter alia:

"A process for the preparation of an aqueous dispersion of ceria which comprises forming a slurry of cerium (IV) hydroxide with water and an acid, the acid being capable of causing deaggregation of aggregated crystallites in the cerium (IV) hydroxide, heating the slurry for such a time that the pH reaches a steady value, the quantity of acid in the slurry being such that the said steady value of pH is below 5.4, thereby to produce a conditioned slurry and admixing water with the conditioned slurry to produce an aqueous dispersion of cerium".

British patent application No. 22835/78 also discloses (page 6 lines 1 to 3) that certain cerium (IV) hydroxides are not easily susceptible to deaggregation in accordance with the invention disclosed therein and additionally the following passage appears at page 6 line 18 to page 7 line 2:

"Furthermore, to facilitate deaggregation as hereinbefore disclosed we believe that it is preferable that the starting cerium (IV) hydroxide should not have been heated to cause any substantial irreversible loss of water (e.g. heating to >100° C.) prior to treatment in accordance with the present invention. For example we have found that a starting cerium (IV) hydroxide having 25% by weight water can be deaggregated in accordance with the present invention whereas some samples with 10% by weight water content were not easily amenable to deaggregation.

Also we believe that the time and temperature and humidity of any prior heat treatment of the starting cerium (IV) hydroxide may affect the susceptibility of the cerium (IV) hydroxide to deaggregation in accordance with the present invention".

Thus, British patent application No. 228535/78 indicates that it is undesirable to heat cerium (IV) hydroxide to an extent which causes any substantial irreversible loss of water if it is desired to effect deaggregation to give a dispersible product.

Surprisingly in accordance with the present invention a cerium compound which is readily dispersible in aqueous media to give highly concentrated sols may be prepared by a process which involves heating substantially dry cerium (IV) oxide hydrate to give a dry cerium compound.

Cerium (IV) oxide hydrate for treatment in accordance with the present invention can be obtained commercially or, alternatively, can be prepared by any suitable route. For example, it can be prepared from readily available cerium salts, (e.g. of "reagent grade"). The preparation may be by precipitation from a cerium salt.

Thus, for example, as disclosed in British patent application No. 22835/78, high purity cerous carbonate can be dissolved in aqueous nitric or hydrochloric acid to give a neutral solution and then oxidised with $NH_4OH/H_2O_2$ to give cerium (IV) oxide hydrate.

By way of further example cerium (IV) oxide hydrate for treatment in accordance with the present invention may be prepared by the conventional routes disclosed at page 1 lines 40 to 61 of B.P. No. 1342893 (UKAEA).

Cerium (IV) oxide hydrate when prepared by usual commercial preparation routes often contains anions (e.g. nitrate ions). With such oxide hydrates if the concentration of the anions is sufficiently high it is not necessary to add additional acid species prior to heating to effect deaggregation and production of a substantially dry dispersible cerium compound in accordance with the present invention.

If, however, the concentration of acid species is too low to effect the deaggregation on heating additional acid species may be introduced to the cerium (IV) oxide hydrate prior to heating (e.g. by the addition of nitric acid).

Examples of anions suitable for use in accordance with the present invention are nitrate anions, chloride anions, perchlorate anions and any combination of these.

The degree of hydration of the cerium (IV) oxide hydrate starting material may vary over a wide range.

By way of example, dry dispersible cerium compounds have been prepared in accordance with the present invention from cerium (IV) oxide hydrate starting materials having respectively 8% water and 60% water. Also by way of example, dispersible cerium compounds have been prepared from oxide hydrate starting materials having other water contents.

It is preferred that the temperature of heating of the cerium (IV) oxide hydrate is in the range 200°-450° C. and it has been found that heating in the range of 300°-350° C. is particularly useful in producing dry dispersible cerium compounds which can be dispersed to give highly concentrated sols (e.g. >600 gl$^{-1}$ (3.5 M in Ce(IV))).

When nitrate ions are used in accordance with the present invention it is preferred that the nitrate/$CeO_2$ ratio is in the range 0.15 to 0.35 in the cerium (IV) oxide hydrate starting material.

A time of ~1 to 2 hours has been found to a suitable for heating the cerium (IV) oxide hydrate in the range of 200° C. to 450° C. to effect deaggregation in accordance with the present invention.

Preferably the nitrate/CeO$_2$ ratio in the dry dispersible cerium compound is in the range 0.05 to 0.25 and a particularly preferred range is 0.08–0.15.

The cerium (IV) oxide hydrate starting material typically can consist of insoluble particles of up to ~2000 Å diameter (i.e. greater than colloidal dimensions), the particles comprising aggregates of crystallites.

Colloidal dispersions prepared from dispersible cerium compounds prepared in accordance with the present invention show, for example, a 10 to 20-fold reduction in this size in that such dispersions include colloidal size particles comprising individual crystallites (~50 Å) and small aggregates of crystallites of say ~100 Å.

Thus, the heating in the presence of a deaggregating agent in accordance with the present invention achieves deaggregation of the crystallites to enable particles of colloidal dimensions to be obtained.

Deaggregation in accordance with the present invention can involve breaking of bonds between crystallites in an aggregate of crystallites or a weakening of bonds or attractive forces between crystallites in an aggregate of crystallites to a degree that the crystallites can separate when the dispersible cerium compound is introduced into an aqueous medium.

Whilst it is by no means fully established, it is believed that the heating with acid species in accordance with the present invention may involve reaction of acid with hydroxide groups (or oxo-bridges) which link crystallites together thereby to break down aggregates of crystallites.

Thus, in one embodiment it is believed that nitric acid (formed from water, and nitrate ions in the oxide hydrate and supplemented by nitric acid additions if necessary) react with the hydroxide groups (or oxo-bridges) to deaggregate the aggregated crystallites.

The present invention also provides a process for the preparation of a colloidal dispersion of a cerium compound which comprises dispersing in an aqueous medium a dry dispersible cerium compound prepared in accordance with the present invention.

The invention further provides a process for the preparation of a gel which comprises drying a sol which has been prepared by dispersing in an aqueous medium a dry dispersible cerium compound prepared in accordance with the present invention.

The aqueous medium in which the cerium compound is dispersed can be water or aqueous acid solutions (e.g. dilute solutions of nitric acid). Gels may be produced by evaporating the sols at room temperature (~23° C.) or at elevated temperature (~50° C.). The gels are glassy and may be redispersed in water.

The invention further provides a process which comprises mixing a dispersible cerium compound prepared in accordance with the present invention with water at such a concentration that the dispersible cerium compound coagulates to form a slurry and separating the coagulated cerium compound from liquor of the slurry.

The separated coagulated cerium compound may be dispersed in water to form a colloidal dispersion.

By forming a slurry and removing the liquor of the slurry, it is possible to remove anions in the liquor and thereby leave a reduced anion concentration in the coagulated cerium compound. In this way the concentration of anions which may interfere with the formation of a colloidal dispersion is reduced and a more concentrated colloidal dispersion can be formed on admixing the separated coagulated cerium compound with water.

It will be appreciated that where a dispersible cerium compound prepared by heating in accordance with the present invention does not have an anion concentration which prevents a desired concentration of sol being formed, there is no necessity for carrying out the further steps of coagulation to form a slurry, separation and dispersion to reduce the anion concentration.

According to another aspect the present invention provides a sol prepared by a process in accordance with the present invention.

According to a further aspect the present invention provides a gel prepared by a process in accordance with the present invention.

According to yet a further aspect the present invention provides a dry dispersible cerium compound prepared by a process in accordance with the invention.

The invention will now be described, by way of example only, as follows:

EXAMPLE 1

1 Kg of cerium (IV) oxide hydrate ("Ceria Hydrate" obtained from Rhône Poulenc) was placed in a saggar and heated for 1 hour in a muffle furnace at 320° C. in air.

The resulting dry dispersible cerium compound powder (0.78 Kg) had a crystallite size of 59 Å and the NO$_3^-$/Ce(IV) ratio was 0.14.

The degree of aggregation of crystallites in the "Ceria Hydrate" starting material was much greater than the degree of aggregation of crystallites in the dispersible cerium compound. The "Ceria Hydrate" starting material had a NO$_3^-$/CeO$_2$ ratio of 0.18.

EXAMPLE 2

100 g of the dispersible cerium compound powder prepared in Example 1 was dispersed by stirring in hot dimineralised water to form a sol having a concentration of 645 gl$^{-1}$ CeO$_2$ equivalent.

The dispersible cerium compound was 92.1 w/o dispersible in the hot dimineralised water.

EXAMPLE 3

10 g of the dispersible cerium compound powder prepared in Example 1 was dispersed in 100 cm$^3$ of dimineralised water to form a sol having a pH of 3.15 and a conductivity of 2.44 mmho.cm$^{-1}$. After boiling the sol had a conductivity of 3.07 mmho.cm$^{-1}$.

EXAMPLE 4

The procedure of Example 1 was followed with the exception that the temperature of heating was 300° C.

The resulting dry dispersible cerium compound powder had a NO$_3^-$/CeO$_2$ ratio of 0.11 and a crystallite size of 58 Å and was dispersible in water to form a sol.

EXAMPLE 5

The procedure of Example 1 was followed with the exception that the temperature of heating was 350° C.

The resulting dry dispersible cerium compound powder had a NO$_3^-$/CeO$_2$ ratio of 0.04, a crystallite size of 60 Å and was ~80% dispersible in water to form a sol.

EXAMPLE 6

The procedure of Example 1 was followed with the exception that the temperature of heating was 400° C.

The resulting dry dispersible cerium cerium compound powder had $NO_3^-/CeO_2$ ratio of 0.015, a crystallite size of 65 Å and was dispersible to form a sol in water to which a small amount of $HNO_3$ had been added to give a $NO_3^-/CeO_2$ ratio of 0.09.

EXAMPLE 7

A washed cerium (IV) hydrate was prepared from Cerium (III) nitrate solution by oxidising with $NH_4OH/H_2O_2$ as disclosed in British patent application No. 22835/78 hereinbefore mentioned.

The cerium (IV) hydrate thus produced was triturated with diluted nitric acid to give a $NO_3^-/CeO_2$ ratio of 0.23 and then dried at 105° C. to give a substantially dry cerium (IV) oxide hydrate having the composition $CeO_2$ 89.1%, $NO_3$ 7.4%, $H_2O$ (by difference) 3.5%, $NO_3^-/CeO_2 = 0.23$).

The substantially dry cerium (IV) oxide hydrate was heated in a furnace at 320° C. for 2 hours to give a dry dispersible cerium compound having $CeO_2$ content of 96.1% and a nitrate content of 2.8% ($NO_3^-/CeO_2 = 0.08$).

This cerium compound was readily dispersible in water (to 98.9%) to give a stable colloidal dispersion of 400 gl$^{-1}$ concentration.

EXAMPLE 8

A 95% pure commercially available cerium (IV) oxide hydrate (containing ~53% oxide and 5 w/o other Rare Earth compounds), which proved to be unsusceptible to deaggregation treatment to produce a colloidal dispersion when treated with aqueous nitric acid at up to $NO_3^-$/oxide=0.5 in accordance with British patent application No. 22835/78, was treated in accordance with the present invention.

Thus 250 g of the commercially available cerium (IV) hydrate (132.5 g oxide) was treated with 14.2 cm$^3$ of 16 M nitric acid and dried at 105° C. to give a substantially dry powder of cerium (IV) oxide hydrate containing 91.0% oxide, 6.9% $NO_3^-$ ($NO_3^-$/oxide=0.21).

This dry cerium (IV) oxide hydrate was heated in a furnace at 320° C. for 1 hour to give a dry dispersible cerium compound containing 94.1% oxide and 5.1% $NO_3^-$ ($NO_3^-$/oxide=0.15).

This cerium compound was dispersible in water to give a colloidal dispersion of 100 gl$^{-1}$ concentration.

EXAMPLE 9

Dry dispersible cerium compound prepared as in Example 8 was added to water at a concentration sufficient to effect coagulation on boiling to form a slurry.

The coagulated cerium compound was separated from the "nitrate rich" liquor of the slurry by centrifuging and dispersed by stirring in water to form a colloidal dispersion of 200 gl$^{-1}$ concentration.

EXAMPLE 10

50 g of a 99.5% pure cerium (IV) oxide hydrate (containing 87.6 w/o oxide, and some nitrate anion, as supplied by the manufacturer) were mixed with 20 ml of 5.2 M hydrochloric acid (chloride $CeO_2$ mole ratio=0.4).

The resulting mixture was dried and heated at 320° C. for 30 minutes.

The resulting dry dispersible cerium compound powder was readily dispersible in water to give a stable sol of at least 200 gl$^{-1}$ concentration. This sol had a pH of 1.2 and a conductivity of 29.6 mmhos.

EXAMPLE 11

50 g of a 99.5% pure cerium (IV) oxide hydrate (containing 93.0 w/o oxide and containing no nitrate anions as supplied by the manufacturers) were mixed with 21 ml of 5.3 M hydrochloric acid (chloride/$CeO_2$ mole ratio 0.4).

The resulting mixture was dried and heated at 320° C. for 35 minutes to give a dry dispersible cerium compound powder.

EXAMPLE 12

10 g of dry dispersible cerium compund powder prepared as in Example 11 were added to 25 ml of hot water to form a dilute dispersion which on heating coagulated to form a clear supernatant liquor and a precipitate.

After centrifuging, the supernatant liquor was discarded and the residue dispersed in water to form a stable sol containing 200 gl$^{-1}$ of oxide.

The sol had a pH of 1.3 and a conductivity of 20.8 mmhos.

EXAMPLE 13

50 g of 99.5% pure cerium (IV) oxide hydrate (containing 87.6 w/o oxide and some nitrate anion) were mixed with 20 ml of 6.0 M perchloric acid ($ClO_4/CeO_2$ mole ratio=0.4).

The resulting mixture was dried and heated at 320° C. for 30 minutes to give a dry dispersible cerium compound powder.

EXAMPLE 14

The dry dispersible cerium compound powder prepared in Example 14 was readily dispersed in water to give a stable sol containing at least 200 gl$^{-1}$ of cerium oxide with a pH of 1.8 and a conductivity of 8.8. mmhos.

We claim:

1. A process for the preparation of a dispersible cerium compound which comprises heating a substantially dry cerium (IV) oxide hydrate in the presence of a deaggregating agent to cause deaggregation of aggregated crystallites in the cerium (IV) oxide hydrate and produce a dry dispersible cerium compound.

2. A process as claimed in claim 1 wherein the deaggregating agent comprises acid species.

3. A process as claimed in claim 2 wherein the acid species include nitrate anions, chloride anions, perchlorate anions, or any combination thereof.

4. A process as claimed in claim 2 wherein the acid species include nitrate anions and the nitrate/$CeO_2$ ratio in the cerium (IV) oxide hydrate is in the range 0.15 to 0.35.

5. A process as claimed in claim 1 wherein the cerium (IV) oxide hydrate is heated to a temperature in the range 200°–450° C.

6. A process as claimed in claim 5 wherein the cerium (IV) oxide hydrate is heated to a temperature in the range 300°–350° C.

7. A process as claimed in claim 1 further comprising the step of dispersing the dry dispersible cerium compound in an aqueous medium to give a colloidal dispersion of the cerium compound.

8. A process as claimed in claim 7 wherein the aqueous medium is water or an aqueous acid solution.

9. A process as claimed in claim 1 further comprising the steps of mixing the dispersible cerium compound with water at such a concentration that the dispersible cerium compound coagulates to form a slurry and separating the coagulated cerium compound from liquor of the slurry.

10. A process as claimed in claim 9 wherein the separated coagulated cerium compound is dispersed in water to form a colloidal dispersion.

11. A process for the preparation of a gel which comprises drying a sol which has been prepared by dispersing in an aqueous medium a dry dispersible cerium compound prepared by a process as claimed in claim 1.

12. A dry dispersible cerium compound prepared by a process as claimed in claim 1.

13. A dry dispersible cerium compound as claimed in claim 12 wherein nitrate anions are present and the nitrate/$CeO_2$ ratio is in the range 0.05 to 0.25.

14. A dry dispersible cerium compound as claimed in claim 13 wherein the nitrate/$CeO_2$ ratio is in the range 0.08–0.15.

* * * * *